United States Patent
Menzel

(10) Patent No.: US 9,132,380 B2
(45) Date of Patent: Sep. 15, 2015

(54) METHOD AND APPARATUS FOR DECOMPOSING NITROSAMINES FORMED IN REMOVING CO2 FROM FLUE GASES USING AN AQUEOUS AMINE SOLUTION

(71) Applicant: Johannes Menzel, Waltrop (DE)

(72) Inventor: Johannes Menzel, Waltrop (DE)

(73) Assignee: THYSSENKRUPP UHDE GMBH, Dortmund (DE)

( * ) Notice: Subject to any disclaimer, the term of this patent is extended or adjusted under 35 U.S.C. 154(b) by 152 days.

(21) Appl. No.: 13/945,318

(22) Filed: Jul. 18, 2013

(65) Prior Publication Data

US 2013/0340611 A1 Dec. 26, 2013

Related U.S. Application Data

(63) Continuation-in-part of application No. PCT/EP2011/072469, filed on Dec. 12, 2011.

(30) Foreign Application Priority Data

Jan. 21, 2011 (DE) .......................... 10 2011 000 268

(51) Int. Cl.
*B01D 53/14* (2006.01)
*B01D 53/00* (2006.01)

(52) U.S. Cl.
CPC .......... *B01D 53/1425* (2013.01); *B01D 53/007* (2013.01); *B01D 53/1475* (2013.01); *B01D 2259/804* (2013.01); *Y02C 10/04* (2013.01); *Y02C 10/06* (2013.01)

(58) Field of Classification Search
CPC .......... B01D 2259/804; B01D 53/007; B01D 53/1425; B01D 53/1475; Y02C 10/04; Y02C 10/06
See application file for complete search history.

(56) References Cited

U.S. PATENT DOCUMENTS

| 5,847,129 | A * | 12/1998 | Harfmann et al. | ............ 544/173 |
| 2009/0320682 | A1 | 12/2009 | Wagner et al. | |
| 2011/0308389 | A1 | 12/2011 | Graff et al. | |
| 2012/0230896 | A1 | 9/2012 | Wagner et al. | |
| 2013/0053614 | A1 | 2/2013 | Jackson et al. | |
| 2014/0345458 | A1* | 11/2014 | Klinker | ............ 95/186 |

FOREIGN PATENT DOCUMENTS

| WO | 2008/025743 A1 | 3/2008 | |
| WO | WO 2008025743 A1 * | 3/2008 | ............ B01D 53/14 |
| WO | 2010/102877 A1 | 9/2010 | |
| WO | WO 2010102877 A1 * | 9/2010 | ............ B01D 53/14 |
| WO | 2011/100801 A1 | 8/2011 | |
| WO | WO 2011100801 A1 * | 8/2011 | |

* cited by examiner

*Primary Examiner* — Duane Smith
*Assistant Examiner* — Cabrena Holecek
(74) *Attorney, Agent, or Firm* — Lucas & Mercanti, LLP; Jonathan Myers

(57) ABSTRACT

The invention relates to a method and apparatus for reducing nitrosamines, formed in removal of $CO_2$ from off-gases by means of an aqueous amine solution. A substream of the aqueous amine solution, loaded with nitrosamines, is branched off from a washing fluid circulation and is concentrated by evaporating water and low-boiling constituents. The concentrated amine solution is retained at the boiling point in a unit in which a liquid phase and a vapor phase are in contact to establish a vapor/fluid equilibrium between the phases. The vapor phase is irradiated with UV light, which decomposes nitrosamines entering the vapor phase. Following decomposition of nitrosamines, the concentrated amine solution is recycled to the washing fluid circulation for further use in the scrubber.

8 Claims, 1 Drawing Sheet

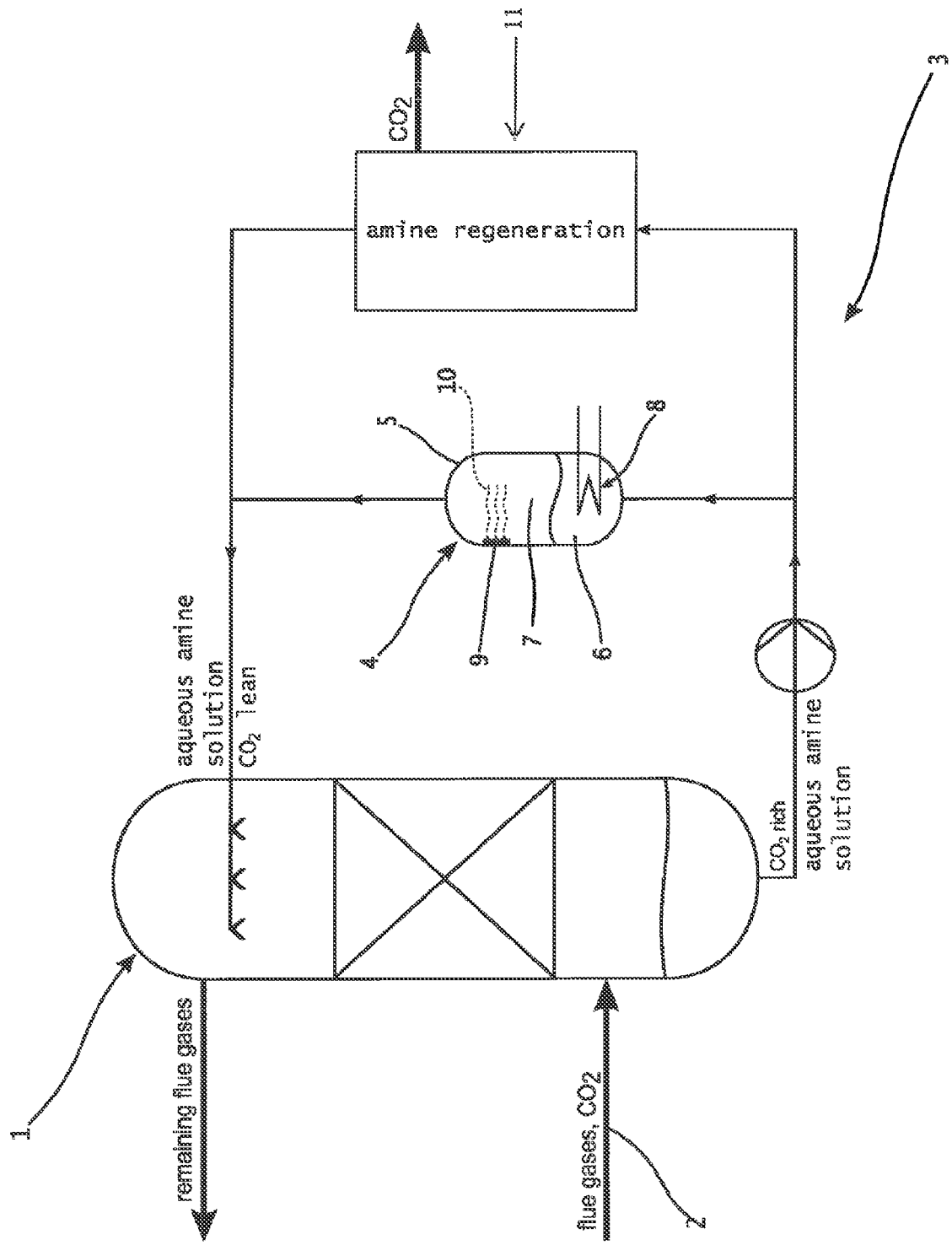

METHOD AND APPARATUS FOR DECOMPOSING NITROSAMINES FORMED IN REMOVING CO2 FROM FLUE GASES USING AN AQUEOUS AMINE SOLUTION

CROSS REFERENCE TO RELATED APPLICATIONS

This application is a continuation-in-part of PCT/EP 2011/072469 filed 12 Dec. 2011, the contents of which are expressly incorporated herein, and which claims the benefit of the priority of German Patent Application DE 10 2011 000 268.5 filed 21 Jan. 2011.

FIELD OF THE INVENTION

The invention relates to a method for reducing nitrosamines formed in removal of $CO_2$ from flue gases by using an aqueous amine solution.

BACKGROUND OF THE INVENTION

It is known from the literature that nitrosamines are formed in removal of $CO_2$ from flue gases from power plants fired using fossil fuels. These nitrosamines result from reactions of the $NO_x$ gas components present in the flue gas and the amines present in the solvents for the $CO_2$ scrubbing. According to the information available so far, these reactions preferentially take place with secondary amines, which are always present in the industrially synthesized amines. In addition, primary amines combine with the oxygen present in flue gas to form decomposition products which also include secondary amines. It may therefore be considered certain that nitrosamines are formed in the aqueous amine solution and also accumulate there, regardless of whether primary, secondary or tertiary amines are used for the $CO_2$ scrubbing.

Nitrosamines are considered to be carcinogenic substances. It is therefore necessary to ensure that the nitrosamine content of the amine solution is limited to the extent that nitrosamine compounds are not discharged with the flue gas from the $CO_2$ scrubbing. As long as the nitrosamine concentration in the amine solution is low, a secondary scrubbing stage installed in the $CO_2$ absorption column is used to ensure that the nitrosamines are always backwashed and remain in the solution. However, if the nitrosamine concentration continues to increase, there is the risk that nitrosamines might enter the off-gas of the power plant.

It is known that nitrosamines decompose in the atmosphere, which reduces the environmental threat, but it is questionable whether nitrosamines decompose rapidly enough in the atmosphere. In comparison with off-gas consisting essentially of nitrogen, nitrosamines have a significantly higher molecular weight with a high boiling point accordingly and therefore have a tendency to settle to the ground because they are heavier than air. For health and safety reasons and also for environmental protection reasons, it is therefore necessary to ensure that no nitrosamines enter the environment from the solvent circulation. This can be achieved, as mentioned above, if the concentration of nitrosamines in the solvent circulation is limited and an unhindered increase in the amine solution is prevented.

OBJECT OF THE INVENTION

Against this background, the object of the present invention is to provide a technically simple and reliable method for reducing the concentration of nitrosamines, which are formed in the removal of $CO_2$ from flue gas by using an aqueous amine solution and to prevent them from accumulating in the washing fluid.

SUMMARY OF THE INVENTION

According to the invention, a substream of the nitrosamine-laden aqueous amine solution is branched off from a washing fluid circulation and is concentrated by evaporating water and low-boiling constituents. The concentrated amine solution then remains at the boiling point in an apparatus in which a liquid phase and a gaseous phase are in contact and a vapor-liquid equilibrium is established between the phases. The gaseous phase is irradiated with UV light inside the apparatus, thereby decomposing the nitrosamines that have entered the vapor phase. After the treatment, the concentrated amine solution, which has been largely freed of nitrosamines, is returned to the washing fluid circulation.

The method according to the invention makes use of the finding that nitrosamines are decomposed by the action of UV light. However, one must take into account the fact that the dwell time and/or treatment time of the UV radiation required for decomposition of nitrosamine is/are long and that the boiling point of the resulting nitrosamines is much higher than the boiling point of the solvent, so that only a low concentration of nitrosamines is present in vapor form inside an amine scrubber. According to the invention, the UV radiation is therefore limited to the quantity of fluid branched off from the washing fluid circulation and is concentrated greatly by evaporating the water and low-boiling constituents prior to the UV radiation treatment. Due to the concentration of the amine solution prior to the UV irradiation, the sparingly volatile nitrosamines are present in a much higher concentration in the vapor phase, where they are then exposed to UV irradiation and decomposed. The liquid phase and the vapor phase are in a vapor-liquid equilibrium during the UV irradiation of the vapor phase. They disappear from the vapor phase due to the fact that the evaporated nitrosamine molecules are decomposed by the UV light, so that new nitrosamine molecules enter the vapor phase from the liquid phase via the new setting of the vapor-liquid equilibrium. It is possible in this way to decompose most of the nitrosamine molecules present in the concentrated amine solution in a sufficiently long holding time.

The method according to the invention can be performed in such a way that nitrosamines are decomposed through UV irradiation of the vapor phase within the apparatus in an amount corresponding at least to the amount formed anew as a result of a gas scrubbing of the flue gas.

The vapors generated in concentrating the amine solution laden with nitrosamines are recycled to the scrubbing liquid circulation. By reducing the pressure on the vapors, they may be introduced into the sump of the regeneration column. The vapors may also be condensed and returned to the liquid circulation as a condensate. The evaporation and subsequent UV irradiation may optionally be performed at atmospheric pressure, at an excess pressure greater than 1 bar or alternatively also at a pressure less than 1 bar.

According to a preferred feature of the invention, during a first operating phase, a substream of the aqueous amine solution loaded with nitrosamines is branched off from the washing fluid circulation and sent to an apparatus having a container to receive the fluid, a vapor space and an evaporator. Water and low-boiling constituents are evaporated from the amine solution in the container, and the vapors are recycled to the washing fluid circulation. After achieving a predetermined amine concentration, the fluid flow to the apparatus is cut off or throttled at least to a limit value approaching zero.

At the same time, the heating performance of the evaporator is reduced to the extent that the operating pressure remains constant and the amount of steam removed from the evaporator is also reduced to a flow rate approaching the limit value of zero. This operating state is retained during irradiation of the vapor space with UV light. The holding time may be 100 hours or more, but a holding time of approximately 10 to 20 hours is generally sufficient. With a sufficiently long holding time of 10 to 20 hours, for example, it is possible to decompose most of the nitrosamine molecules contained in the concentrated amine solution.

The first operating phase serves essentially to evaporate the water present in the amine solution. The first operating phase describes a non-steady-state evaporation process followed by semicontinuous operation, in which precisely the same quantity of solution as that supplied to the apparatus is evaporated. Sparingly volatile compounds collect in the liquid phase. In the semicontinuous state, the amounts by weight of amine in the vapor phase (measured in wt %) and the amine flow rate supplied to the apparatus with the liquid stream branched off from the washing fluid circulation are the same. This leads to an increase in the amine concentration in the solution in the apparatus. Due to the fact that the boiling point of amines, like the boiling point of nitrosamines, is much higher than that of water, the boiling point of the solution becomes higher with a higher amine concentration in the semicontinuous state. The first operating phase for concentrating the amine solution is preferably retained until the amine quantity flow removed with the vapor corresponds approximately to the amine quantity flow supplied to the apparatus with the fluid stream branched off from the washing fluid circulation. Then the highest nitrosamine concentration is established in the vapor phase.

With the method according to the invention, it is possible to keep the nitrosamines which are formed in the amine solution at a low concentration level in a simple and reliable manner. The method according to the invention for decomposition of nitrosamine by UV radiation can also be performed in equipment that is provided for removing high-boiling decomposition products. These equipment units, which are also known as reclaimer units, are operated semicontinuously and for a period of 100 to 200 hours, for example, depending on the design. They may be equipped with a unit for UV radiation in addition to the apparatus for removal of nitrosamines. An additional holding time of 20 hours, for example, for decomposition of nitrosamines, is of no consequence in the semicontinuous operation of the equipment described here and also does not have any particularly great influence on the size of the equipment. The method according to the invention constitutes an inexpensive possibility for equipping reclaimer units, which operate according to the evaporator principle and are designed for purifying the amine solution to remove high-boiling components, with an additional function.

The subject matter of the invention also includes an apparatus for performing the method described here. This apparatus comprises, according to the invention, a gas scrubber for removing $CO_2$ from flue gases by means of an aqueous amine solution, a washing fluid circulation provided for the gas scrubber and an apparatus with a means for ultraviolet radiation for removal of nitrosamines which are formed in an amine scrubbing of the flue gases, and a unit comprising a closed container with a liquid space, a vapor space and an evaporator and is connected to the washing fluid circulation. According to the invention, the vapor space is equipped with a device for irradiating the vapor phase with UV light. The apparatus may also include a unit for stripping $CO_2$ from the aqueous amine scrubbing solution to regenerate the aqueous amine scrubbing solution which is then added to the washing fluid circulation for further use in the scrubber.

BRIEF DESCRIPTION OF THE DRAWING

The sole FIGURE in this application is a schematic diagram according to the present invention showing the method and apparatus for decomposing nitrosamines that form during scrubbing of flue gases with an aqueous amine solution to remove carbon dioxide therefrom.

DETAILED DESCRIPTION OF THE DRAWING

This apparatus comprises, according to the invention, a gas scrubber 1 for removing $CO_2$ from flue gases which enter the scrubber through conduit 2 by means of an aqueous amine solution, a washing fluid circulation 3 provided for the gas scrubber 1 and a unit 4 for removal of nitrosamines which are formed in an amine scrubbing of the flue gases 2. This unit 4 has a closed container 5 with a liquid space 6, a vapor space 7 and an evaporator 8 and is connected to the washing fluid circulation 3. According to the invention, the vapor space 7 is equipped with a device 9 for irradiating the vapor phase with UV light 10. The apparatus also may include a unit 11 for stripping $CO_2$ from the aqueous amine scrubbing solution to regenerate the aqueous amine scrubbing solution which is then added to the washing fluid circulation for further use in the scrubber.

What is claimed is:

1. A method of decomposing nitrosamines contained in a nitrosamine-laden aqueous amine solution obtained through scrubbing of carbon dioxide from flue gases with an amine-containing circulating washing fluid, which comprises the steps of:
   (a) branching off a substream of the nitrosamine-laden aqueous amine solution from the washing fluid circulation and concentrating the nitrosamine-laden aqueous amine solution by evaporating water and low boiling constituents therefrom;
   (b) retaining the concentrated nitrosamine-laden aqueous amine solution at its boiling point in which a liquid phase and a vapor phase are in contact, to establish a vapor/liquid equilibrium between the liquid phase and the vapor phase;
   (c) irradiating the vapor phase with ultraviolet light to decompose the nitrosamines entering the vapor phase to obtain a concentrated aqueous amine solution from which the nitrosamines have been removed; and
   (d) recycling the concentrated aqueous amine solution from which the nitrosamines have been removed back to the circulating washing fluid.

2. The method of decomposing nitrosamines defined in claim 1 wherein according to step (c) irradiating the vapor phase with ultraviolet light decomposes the nitrosamines in an amount which corresponds at least to an amount formed anew in the scrubbing of carbon dioxide from flue gases prior to step (a).

3. The method of decomposing nitrosamines defined in claim 1 further comprising the step following step (a) of recycling the evaporated water and low boiling constituents, which occur in concentrating the nitrosamine-laden aqueous amine solution, from the nitrosamine-laden aqueous amine solution back to the circulating washing fluid.

4. The method according to claim 1 in which during a first operating phase, carrying out step (a) by sending the substream, loaded with nitrosamines branched off from the washing fluid circulation, to an apparatus which has a container to receive a fluid, a vapor space and an evaporator, evaporating water and low-boiling constituents from the amine solution in the container, in order to recycle vapors back to the washing fluid circulation, after reaching a predetermined amine concentration, cutting off flow of fluid to the apparatus or throttling flow of fluid to a limit value approaching zero resulting in reduction of heating performance of the evaporator to an extent that operating pressure remains constant and resulting in a reduced quantity of evaporated water removed from the evaporator to a flow rate which approaches the limit value of zero, and retaining this operating state during irradiation of the vapor space with UV light according to step (c).

5. The method according to claim 4, further comprising retaining the first operating phase until the amine flow rate removed with the vapor corresponds approximately to the amine flow rate supplied for evaporation with the fluid stream branched off from the washing fluid circulation.

6. The method according to claim 4, further comprising retaining the operating state for UV irradiation of the vapor phase over a period of up to 100 hours.

7. The method according to claim 4 further comprising the step of separating high-boiling impurities from the amine solution.

8. An apparatus for performing the method according to claim 1 comprising a gas scrubber for removal of $CO_2$ from flue gases by means of an aqueous amine solution, a washing fluid circulation allocated to the gas scrubber and a unit for removing nitrosamines which are formed in an amine scrubbing of the flue gas, wherein the unit has a closed container with a fluid space, a vapor space and an evaporator and is connected to the washing fluid circulation, and the vapor space is equipped with a device for irradiation of the vapor phase with UV light.

\* \* \* \* \*